(12) United States Patent
Kubota et al.

(10) Patent No.: US 10,181,379 B2
(45) Date of Patent: Jan. 15, 2019

(54) COMPOSITE SHEET, MULTILAYER CERAMIC ELECTRONIC COMPONENT, AND METHOD FOR MANUFACTURING THE MULTILAYER CERAMIC ELECTRONIC COMPONENT

(71) Applicant: Murata Manufacturing Co., Ltd., Nagaokakyo-shi, Kyoto-fu (JP)

(72) Inventors: Yoshiharu Kubota, Nagaokakyo (JP); Hironori Tsutsumi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/807,691

(22) Filed: Nov. 9, 2017

(65) Prior Publication Data

US 2018/0068789 A1    Mar. 8, 2018

Related U.S. Application Data

(62) Division of application No. 14/524,064, filed on Oct. 27, 2014, now Pat. No. 9,842,692.

(30) Foreign Application Priority Data

Oct. 31, 2013  (JP) ................................ 2013-226496

(51) Int. Cl.
  *H01G 4/012* (2006.01)
  *H01G 4/30* (2006.01)
  (Continued)

(52) U.S. Cl.
  CPC ........... *H01G 4/012* (2013.01); *H01G 4/0085* (2013.01); *H01G 4/12* (2013.01); *H01G 4/30* (2013.01); *Y10T 29/43* (2015.01)

(58) Field of Classification Search
  CPC ......... H01G 4/012; H01G 4/0085; H01G 4/30
  See application file for complete search history.

(56) References Cited

U.S. PATENT DOCUMENTS 5,101,319 A * 3/1992 Diffeyes ............... H01G 4/308
                                                 29/25.42
8,804,301 B2 * 8/2014 Kim ........................ H01B 1/22
                                                 361/301.4
(Continued)

FOREIGN PATENT DOCUMENTS

JP     2012056143 A  *  3/2012
JP     2012142451 A  *  7/2012

OTHER PUBLICATIONS

Kubota et al., "Composite sheet, Multilayer Ceramic Electronic Component, and Method for Manufacturing The Multilayer Ceramic Electronic Component", U.S. Appl. No. 14/524,064, filed Oct. 27, 2014.

*Primary Examiner* — David M Sinclair
(74) *Attorney, Agent, or Firm* — Keating & Bennett, LLP

(57) ABSTRACT

A composite sheet includes a ceramic green sheet having a lengthwise direction and a conductor film printed on the ceramic green sheet. The conductor film has a shape that has a longitudinal dimension extending in the lengthwise direction and a lateral dimension perpendicular or substantially perpendicular to the longitudinal direction. The conductor film includes a plurality of thickness-varied regions arranged in a row or a plurality of rows extending in the lengthwise direction while being dispersed in the lengthwise direction. The thickness-varied regions have a thickness that is different from a thickness of a portion of the conductor film excluding the thickness-varied regions.

6 Claims, 18 Drawing Sheets

(51) Int. Cl.
*H01G 4/008* (2006.01)
*H01G 4/12* (2006.01)

(56) References Cited

U.S. PATENT DOCUMENTS

| | | | |
|---|---|---|---|
| 2004/0209197 A1* | 10/2004 | Hashimoto | B41F 13/11 |
| | | | 430/320 |
| 2005/0214517 A1* | 9/2005 | Sugimoto | B32B 18/00 |
| | | | 428/209 |
| 2007/0107611 A1* | 5/2007 | Takashima | B41F 9/00 |
| | | | 101/153 |
| 2013/0003257 A1* | 1/2013 | Kim | H01B 1/22 |
| | | | 361/321.4 |

* cited by examiner

COMPOSITE SHEET, MULTILAYER CERAMIC ELECTRONIC COMPONENT, AND METHOD FOR MANUFACTURING THE MULTILAYER CERAMIC ELECTRONIC COMPONENT

BACKGROUND OF THE INVENTION

1. Field of the Invention

The present invention relates to composite sheets including a conductor film located on a ceramic green sheet, a multilayer ceramic electronic component including the composite sheets, and a method for manufacturing the multilayer ceramic electronic component.

2. Description of the Related Art

A multilayer ceramic electronic component such as a multilayer ceramic capacitor has been manufactured thus far in the following manner. Firstly, an internal electrode is printed on a ceramic green sheet to form a composite sheet. Then, multiple composite sheets of this type are been stacked on top of one another. As the size of the multilayer ceramic electronic components has been reduced, the number of ceramic green sheets and internal electrodes to be stacked on top of one another has been increasing. The increase in number of sheets and electrodes requires a longer time for stacking the sheets and the electrodes on top of one another. If the time for stacking the sheets and the electrodes is reduced, the interlayer adhesion is weakened. If the interlayer adhesion is weakened, layers become more likely to be displaced from one another during a stacking step.

International Publication No. WO 2011/071143 discloses a multilayer ceramic electronic component that includes internal electrodes each having a saddle portion protruding in the thickness direction at its end portion. These internal electrodes are stacked in such a manner that the saddle portions do not overlap one another in the thickness direction, whereby delamination is prevented.

As described in International Publication No. WO 2011/071143, the structure in which each internal electrode includes a saddle portion can prevent delamination from occurring and enhance the adhesion between the internal electrodes and the ceramic green sheets at the internal-electrode end portions. The enhancement of the adhesion is considered to prevent the electrodes and the sheets from being displaced from one another during the stacking step.

However, further size reduction of multilayer ceramic electronic components requires a further enhancement of the adhesion between internal electrodes and ceramic green sheets.

SUMMARY OF THE INVENTION

Accordingly, preferred embodiments of the present invention provide a composite sheet that has an enhanced adhesion between a conductor film and a ceramic green sheet so as to be capable of effectively preventing stacking displacement. Other preferred embodiments of the present invention provide a multilayer ceramic electronic component that has an enhanced adhesion between ceramic layers and internal electrodes and a method for manufacturing the multilayer ceramic electronic component.

A composite sheet according to a preferred embodiment of the present invention includes a ceramic green sheet having a lengthwise direction and a conductor film printed on the ceramic green sheet. The conductor film includes a plurality of thickness-varied regions arranged in a row extending in the lengthwise direction while being dispersed in the lengthwise direction, the thickness-varied regions have a thickness that is different from a thickness of a portion of the conductor film excluding the thickness-varied regions.

In a composite sheet according to another preferred embodiment of the present invention, the thickness-varied regions have a dot shape or substantially a dot shape when seen in a plan view.

In a composite sheet according to another preferred embodiment of the present invention, the plurality of thickness-varied regions define a plurality of rows.

In a composite sheet according to another preferred embodiment of the present invention, the thickness-varied regions are thin regions that have a smaller thickness than the portion of the conductor film excluding the thickness-varied regions.

In a composite sheet according to another preferred embodiment of the present invention, the thickness-varied regions are thick regions that have a larger thickness than the portion of the conductor film excluding the thickness-varied regions.

In a composite sheet according to another preferred embodiment of the present invention, a center thin region that has a smaller thickness than the thick regions is provided within the thick regions.

A multilayer ceramic electronic component according to a preferred embodiment of the present invention includes a sintered ceramic compact and a plurality of internal electrodes disposed in the sintered ceramic compact so as to be stacked on top of one another with ceramic layers interposed therebetween. At least one of the internal electrodes has a flat or substantially flat shape having a longitudinal direction and a lateral direction perpendicular or substantially perpendicular to the longitudinal direction. The at least one of the internal electrodes includes a plurality of density-varied regions dispersedly arranged in a row or a plurality of rows extending in the longitudinal direction, the density-varied regions have a density different from a density of a portion of the at least one of the internal electrodes excluding the density-varied regions.

In a multilayer ceramic electronic component according to another preferred embodiment of the present invention, the density-varied regions have a dot shape or substantially a dot shape when seen in a plan view.

In a multilayer ceramic electronic component according to another preferred embodiment of the present invention, the plurality of the density-varied regions define a plurality of rows.

In a multilayer ceramic electronic component according to another preferred embodiment of the present invention, the density-varied regions are low-density regions that have a lower density than the portion of the at least one of the internal electrodes excluding the density-varied regions.

In a multilayer ceramic electronic component according to another preferred embodiment of the present invention, the density-varied regions are high-density regions that have a higher density than the portion of the at least one of the internal electrodes excluding the density-varied regions.

In a multilayer ceramic electronic component according to another preferred embodiment of the present invention, a center low-density region that has a lower density than the high-density regions is provided within the high-density regions.

In a multilayer ceramic electronic component according to another preferred embodiment of the present invention, the multilayer ceramic electronic component is a multilayer ceramic capacitor.

A method for manufacturing a multilayer ceramic electronic component according to another preferred embodiment of the present invention includes a step of preparing a plurality of composite sheets each according to any one of the other preferred embodiments of the present invention; a step of stacking the plurality of composite sheets on top of one another to obtain a multilayer body; a step of cutting the multilayer body into multilayer pieces forming individual multilayer ceramic electronic components; and a step of sintering the multilayer pieces forming the individual multilayer ceramic electronic components to obtain sintered ceramic compacts each including a plurality of internal electrodes formed by sintering the conductor films.

In the composite sheets according to various preferred embodiments of the present invention, the conductor films include multiple thickness-varied regions arranged in a row or rows extending in the lengthwise direction. Thus, when multiple composite sheets are stacked on top of one another, the composite sheets are effectively prevented from being displaced from one another. In addition, the adhesion between the conductor film and the ceramic green sheet is effectively enhanced.

By performing a method for manufacturing a multilayer ceramic electronic component according to various preferred embodiments of the present invention using a composite sheet according to various preferred embodiments of the present invention, a multilayer ceramic electronic component according to various preferred embodiments of the present invention are provided. Multilayer ceramic electronic components according to various preferred embodiments of the present invention effectively enhance the adhesion between internal electrodes and ceramics, and significantly reduce or prevent stacking displacement.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
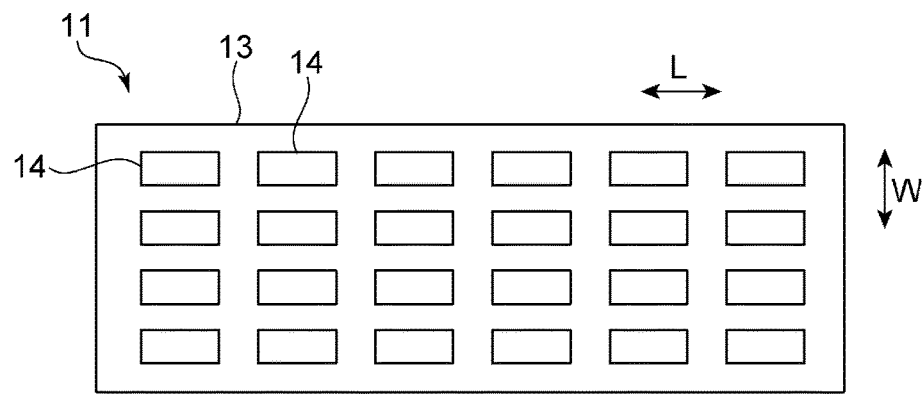
FIG. 1A is a plan view of a composite sheet prepared according to a first preferred embodiment of the present invention.

Referring now to the drawings, the present invention is disclosed below by describing specific preferred embodiments of the present invention.

First Preferred Embodiment

A first preferred embodiment of the present invention preferably is a multilayer ceramic capacitor, serving as a non-limiting example of a multilayer ceramic electronic component, and a method for manufacturing the multilayer ceramic capacitor.

Figure 2A:
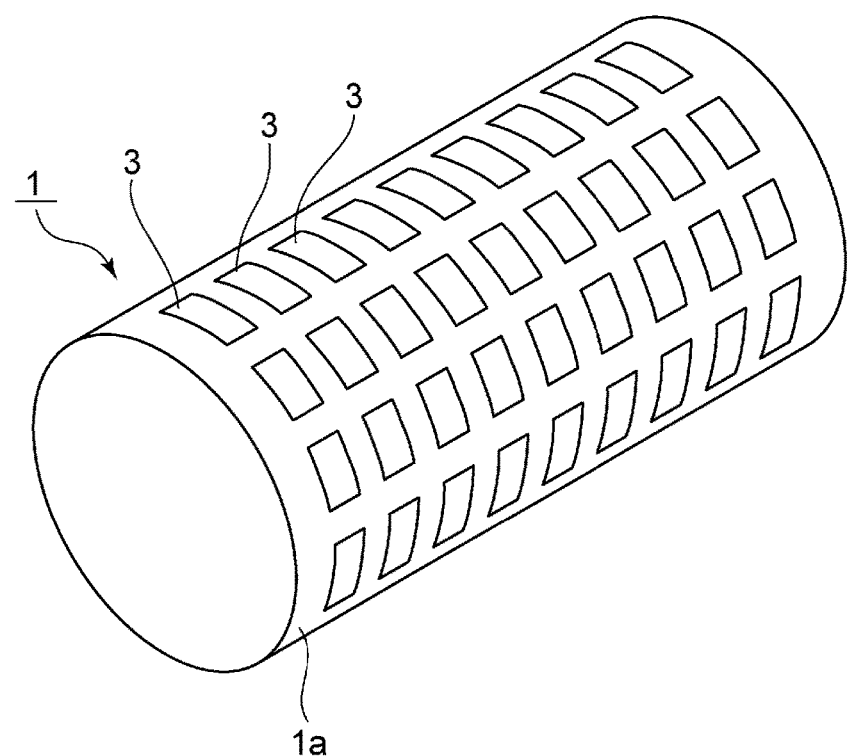
FIG. 2A is a rough perspective view illustrating a photogravure used for printing a conductor film according to the first preferred embodiment of the present invention and FIG. 2B is a schematic plan view illustrating a printing unit of the photogravure.

In the first preferred embodiment, a photogravure 1 illustrated in FIG. 2A is used to form a conductor film by printing. The photogravure 1 is used to print a conductive paste on a ceramic green sheet by a photogravure process. The photogravure 1 has a cylindrical shape. The photogravure 1 is made of appropriate metal such as a stainless steel.

Figure 2B:
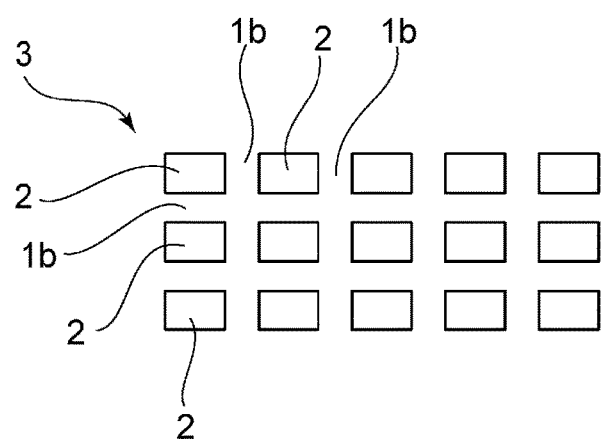

Multiple cells 2 are formed on an outer circumferential surface of the photogravure 1. Portions of a conductive paste transferred from the multiple cells 2 are connected together to form a single print. Thus, as schematically illustrated in FIG. 2B, a single printing portion 3 that forms a single print includes multiple cells 2.

Each cell 2 is a recess formed in a surface 1a of the photogravure 1. A portion between pairs of adjacent recesses defines and functions as a bank 1b that separates the adjacent cells 2 from each other.

Here, as will be described below, the multiple cells 2 do not necessarily have to be completely separated from each other by the bank.

Figure 4A:
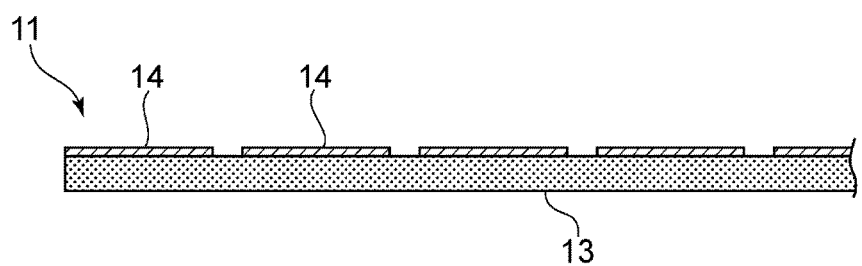
FIGS. 4A and 4B are cross-sectional front views respectively illustrating first and second composite sheets prepared by the method for manufacturing a multilayer ceramic electronic component according to the first preferred embodiment of the present invention.
Figure 4B:
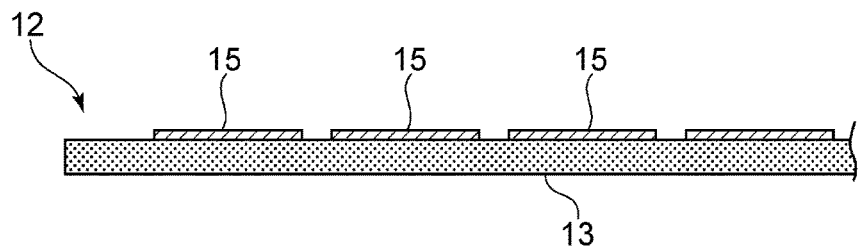

In the first preferred embodiment, first composite sheets 11 illustrated in FIG. 4A and second composite sheets 12 illustrated in FIG. 4B are prepared. The first composite sheets 11 are formed by printing multiple conductor films 14 on a mother ceramic green sheet 13 using the photogravure 1.

Ceramic materials for the ceramic green sheet 13 are not particularly limited. Examples usable as the ceramic materials include dielectric ceramics mainly composed of materials such as $BaTiO_3$, $CaTiO_3$, $SrTiO_3$, or $CaZrO_3$. In the case where a component such as a multilayer ceramic piezoelectric device or a multilayer ceramic inductor is formed as a multilayer ceramic electronic component, materials such as piezoelectric ceramics or magnetic ceramics may be used in accordance with the functions of the component.

As illustrated in FIG. 1A, multiple conductor films 14 are arranged in a matrix on a ceramic green sheet 13.

Also in the second composite sheet 12 illustrated in FIG. 4B, multiple conductor films 15 are printed on a mother ceramic green sheet 13. The multiple conductor films 15 are made of the same material as and arranged in the same manner as the multiple conductor films 14.

Figure 1B:
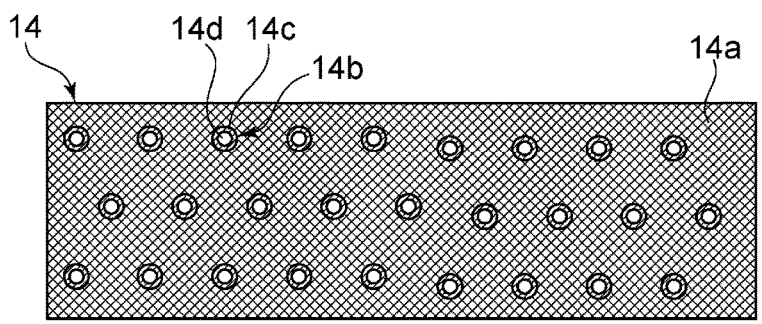
FIG. 1B is a schematic plan view of a conductor film.
Figure 1C:
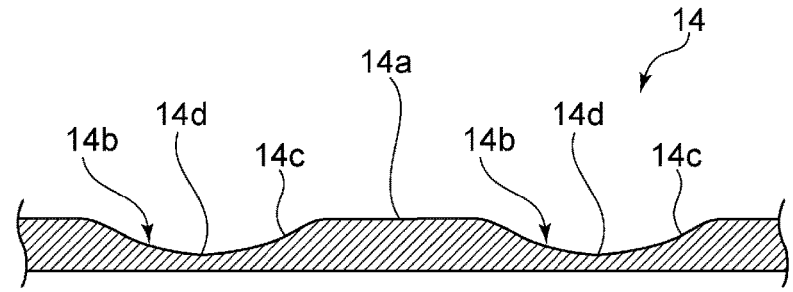
FIG. 1C is an enlarged cross-sectional view of a related portion of the conductor film.

One of the unique features of the present preferred embodiment is that the conductor films 14 and the conductor films 15 each have a unique thickness distribution. Referring now to FIGS. 1B and 1C, this distribution is described using a conductor film 14 as an example.

The conductor film 14 is formed by using one printing portion 3 illustrated in FIG. 2B. Specifically, multiple cells 2 in one printing portion 3 are filled with portions of a conductive paste. These portions of the conductive paste are transferred and connected together, so that a single conductor film 14 is formed.

The ceramic green sheet 13 illustrated in FIG. 1A is a long ceramic green sheet. The direction of the length is defined as a lengthwise direction L. The direction perpendicular to the lengthwise direction L is defined as a widthwise direction W.

As illustrated in FIG. 1A, in the composite sheet 11, multiple conductor films 14 are arranged in a matrix along the lengthwise direction L and the widthwise direction W. Each conductor film 14 preferably has a rectangular or substantially rectangular shape having a lengthwise direction and a widthwise direction. The lengthwise direction of the conductor film 14 is defined as the same direction as the lengthwise direction L.

FIG. 1B is a plan view schematically illustrating the thickness distribution of a single conductor film 14. In FIG. 1B, a region of the conductor film 14 having the largest thickness is cross-hatched. Within a first region 14a of the conductor film 14, which is the cross-hatched region, multiple dot-shaped second regions 14b are provided. Each second region 14b includes a thin portion 14d, which has a smaller thickness than the first region 14a, at its center portion. A ring-shaped region extending from the outer circumference of the thin portion 14d to the first region 14a is defined as a thickness transition region 14c. Each second region 14b is a thin region having a smaller thickness than the first region 14a and corresponds to a thickness-varied region according to a preferred embodiment of the present invention.

The multiple dot-shaped second regions 14b are dispersed over the conductor film 14 in the lengthwise direction. In other words, the multiple dot-shaped second regions 14b define rows extending in the lengthwise direction. In this preferred embodiment, the number of rows preferably is three, for example. Here, the multiple second regions 14b on both side rows in the widthwise direction are arranged alternately with the multiple second regions 14b on the middle row in the widthwise direction.

FIG. 1C is an enlarged cross-sectional view illustrating a portion in which a pair of adjacent second regions 14b of the conductor film 14 are located.

It should be noted that the thickness distribution of the conductor films 14 and 15 is not illustrated in FIGS. 4A and 4B, since illustration of the thickness distribution is difficult in FIGS. 4A and 4B.

In the present preferred embodiment, the first composite sheets 11 and the second composite sheet 12 are alternately stacked on top of one another. The first composite sheets 11 and the second composite sheets 12 are stacked in such a manner that each conductor film 15 on the upper side in the stacking direction is located between a pair of adjacent conductor films 14 of the first composite sheet 11 on the lower side in the stacking direction.

Subsequently, an appropriate number of unprinted ceramic green sheets are disposed above and below the stacked sheets to define a multilayer body. This multilayer body is pressure-bonded in the thickness direction to define a mother multilayer body 16 illustrated in FIG. 5.

In the mother multilayer body 16, the stacked composite sheets 11 and 12 are caused to firmly adhere to one another by the pressure bonding. Particularly, the conductor films 14 and 15 having the above-described thickness distribution effectively enhance the adhesion between the composite sheets 11 and 12. This structure also effectively prevents the composite sheets 11 and 12 from being displaced from each other during the stacking step. When the conductor films 14 are taken as examples, since each conductor film 14 includes dot-shaped second regions 14b whose thickness is different from the remaining region, as described above, the conductor films 14 are caused to firmly adhere to the ceramic green sheet 13 of a composite sheet 12 stacked on top of the conductor films 14 by the pressure bonding. In the same manner, each conductor film 15 is caused to firmly adhere to the ceramic green sheet 13 of a composite sheet 11 stacked on the conductor films 15. Thus, the adhesion between the conductor films 14 or 15 and the ceramic green sheets 13 is greatly enhanced. Moreover, at the stacking of layers, the displacement of layers in the directions perpendicular or substantially perpendicular to the stacking direction, that is, stacking displacement is effectively prevented.

The method for forming conductor films 14 and 15 having the above-described thickness distribution is described below in detail.

Figure 5:
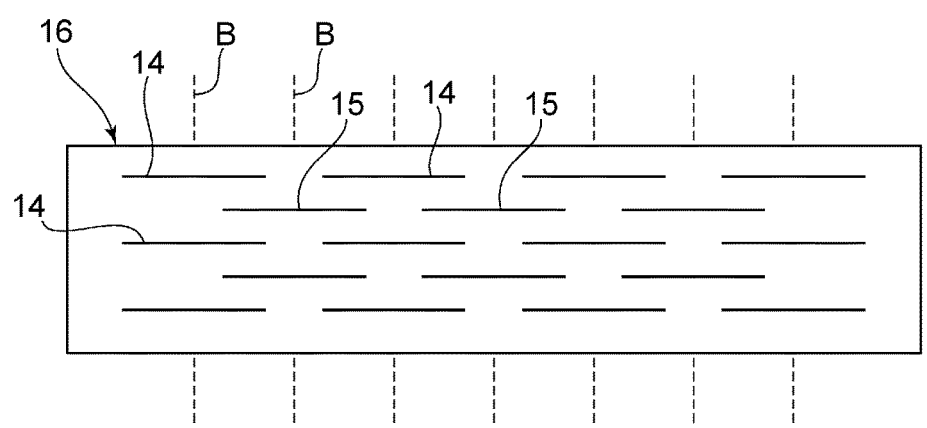
FIG. 5 is a schematic front view illustrating a schematic front view illustrating a mother multilayer body manufactured according to the first preferred embodiment of the present invention.
Figure 6:
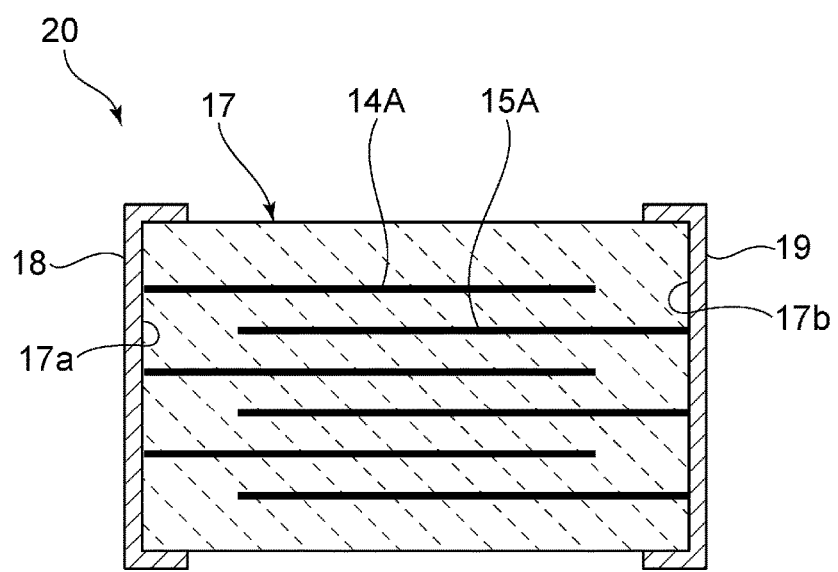
FIG. 6 is a cross-sectional front view illustrating a multilayer ceramic capacitor defining a non-limiting example of a multilayer ceramic electronic component according to the first preferred embodiment of the present invention.

Subsequently, the mother multilayer body 16 is cut in the thickness direction as indicated by broken lines B in FIG. 5 to obtain multilayer pieces defining individual multilayer ceramic capacitors. These multilayer pieces defining individual multilayer ceramic capacitors are sintered, such that sintered ceramic compacts 17, one of which is illustrated in FIG. 6, are obtained.

In each sintered ceramic compact 17, first internal electrodes 14A and second internal electrodes 15A are alternately stacked on top of one another with ceramic layers interposed therebetween. Each first internal electrode 14A is a section of the first conductor film 14. Each second internal electrode 15A is a section of the second conductor film 15.

Multiple first internal electrodes 14A are drawn out to a first end surface 17a. Multiple second internal electrodes 15A are drawn out to a second end surface 17b, opposite to the first end surface 17a. First and second external electrodes 18 and 19 are formed so as to respectively cover the first and second end surfaces 17a and 17b. Consequently, a multilayer ceramic capacitor 20 is obtained.

The first and second external electrodes 18 and 19 can be formed by any appropriate method such as applying and sintering a conductive paste, for example.

In the multilayer ceramic capacitor 20 thus obtained, the adhesion between the conductor films 14 or 15 and the ceramic green sheets 13 has already been enhanced at the stage of the mother multilayer body 16 and stacking displacement is less likely to occur. Thus, also in the obtained sintered ceramic compact 17, the adhesion between the first or second internal electrodes 14A or 15A and the ceramic layers has been effectively enhanced, so that delamination is less likely to occur. Since the stacking displacement is also prevented, a multilayer ceramic capacitor 20 having desired characteristics is easily and reliably provided.

Figure 3:
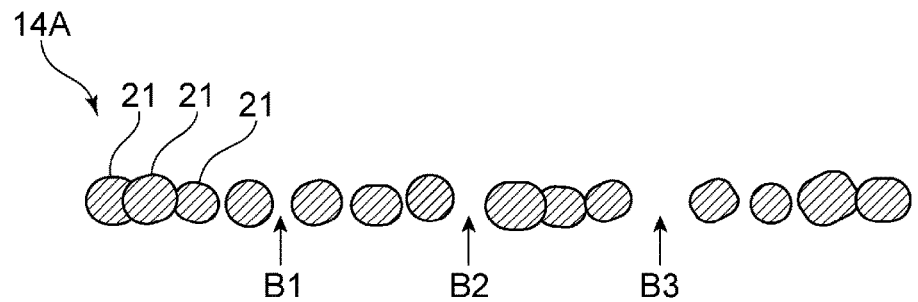
FIG. 3 is an enlarged cross-sectional view schematically illustrating the structure of an internal electrode obtained by sintering the conductor film according to the first preferred embodiment of the present invention.

In the first internal electrodes 14A and the second internal electrodes 15A thus obtained by sintering, the density of conductive particles that form the internal electrodes has a distribution according to the thickness distribution at the stage of the conductor films 14 and 15. This density distribution is described referring to FIG. 3. FIG. 3 is an enlarged cross-sectional view schematically illustrating a cross section of a first internal electrode 14A subjected to sintering. In the first internal electrode 14A, a large number of conductive particles 21 are attached together by sintering. Gaps are formed at portions indicated by arrows B1, B2, and B3. Although not illustrated, other conductive particles are disposed at the main side and oblique sides of each gap. Portions around the gaps have a relatively low density of conductive particles 21 and define low-density regions. Portions around the low-density regions are defined as high-density regions in which a large number of conductive particles 21 exist.

The high-density regions are defined by the above-described first regions 14a of the conductor film 14. On the other hand, the above-described dot-shaped second regions 14b define the low-density regions. This is because, when a conductor film 14 having the above-described thickness distribution is sintered, thin portions become low-density regions in which the density of conductive particles in the internal electrode formed by sintered is low, while thick portions become high-density regions in which the density of conductive particles in the internal electrode is high.

The first and second internal electrodes 14A and 15A of the obtained multilayer ceramic capacitor 20 thus have low-density regions, which define and serve as multiple density-varied regions arranged in rows in the lengthwise direction. Here, the lengthwise direction corresponds to the direction connecting the first end surface 17a and the second end surface 17b together.

In the conductor film 14 illustrated in FIG. 1B, for example, three rows of multiple second regions 14b are preferably provided in parallel or substantially in parallel in the widthwise direction. In the multilayer ceramic capacitor 20 thus obtained, for example, three rows of multiple low-density regions extending in the lengthwise direction are preferably provided in parallel or substantially in parallel in the widthwise direction.

Experiments conducted by the inventors of this application proved that the low-density regions and the high-density regions can be reliably formed in the internal electrodes 14A and 15A under the conditions where the conductor films 14 and 15 before sintering have a thickness within the range of about 0.3 μm to about 1.2 μm, for example, at first regions and a thickness within a range of about 80% to about 99%, for example, of the thickness of the first regions at thin portions of second regions. As described above, in this preferred embodiment, the particle diameter of the conductive particles in the conductive paste prepared for forming the first regions and the dot-shaped second regions including thin regions is preferably about 0.4 μm or smaller, for example. In this preferred embodiment, the conductive particles preferably have a particle diameter on the order of about 0.3 μm, for example. In this manner, the conductor films 14 and 15 according to the present preferred embodiment that are thinner and have thickness distribution is easily formed.

In this preferred embodiment, the low-density regions are provided in the internal electrodes 14A and 15A to define and serve as density-varied regions. However, the density-varied regions do not necessarily have to be areas that have a relatively low density. As will be clear from other preferred embodiments described below, the density-varied regions may be high-density regions that have a higher density than other portions. Alternatively, a center low-density region that has a lower density than the high-density region may be provided within the high-density region.

Referring now to FIG. 7A to FIG. 9, a non-limiting example of a method for forming the conductor film 14 is described.

Figure 7A:
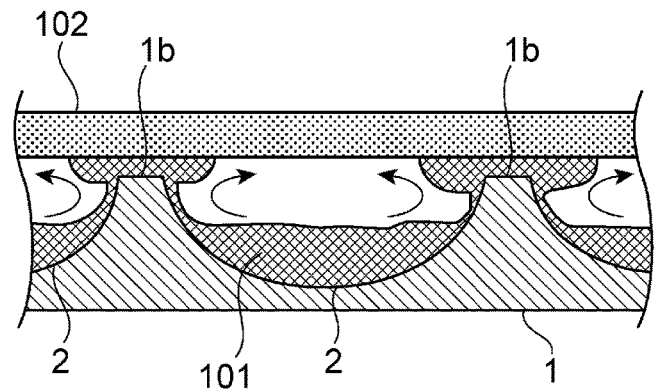
FIGS. 7A to 7C are partially cutaway, enlarged cross-sectional views illustrating a step of transferring a conductive paste from the photogravure to a ceramic green sheet.
Figure 7B:
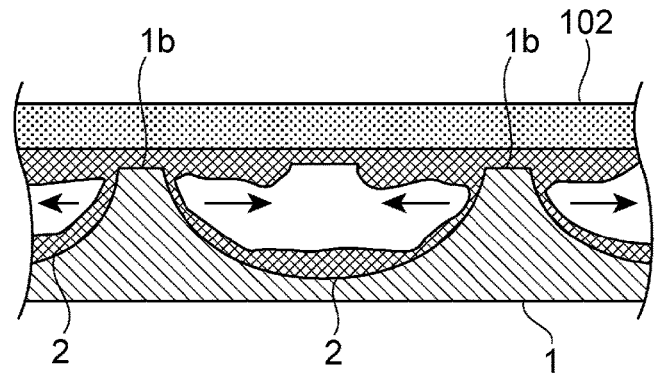
Figure 7C:
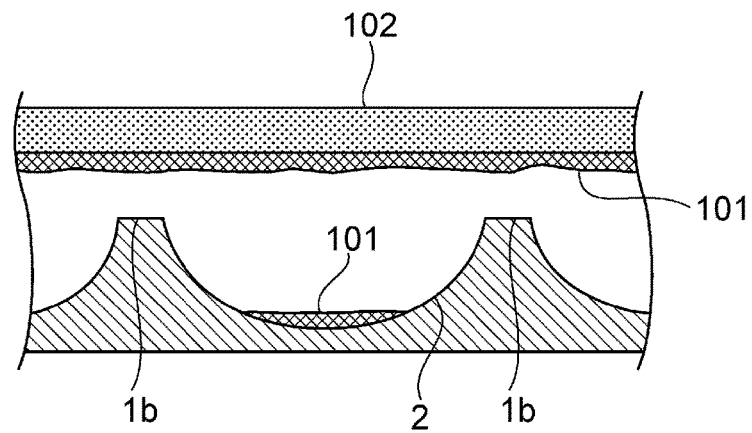

FIGS. 7A to 7C are partially enlarged cross-sectional views illustrating a step of forming existing conductor films having a uniform or substantially uniform thickness without second regions. As illustrated in FIG. 7A, multiple cells 2 are formed on the surface of a photogravure 1. A portion between adjacent cells 2 defines and serves as a bank 1b. A portion of a conductive paste 101 is distributed to each cell 2. A ceramic green sheet 102 is brought into contact with the surface of the photogravure 1 with pressure. Consequently, the portions of the conductive paste 101 are transferred to one side of the ceramic green sheet 102. Here, the conductive paste 101 has fluidity. Thus, the conductive paste 101 gradually moves from the banks 1b to regions each between adjacent banks 1b, from the state illustrated in FIG. 7A to the state illustrated in FIG. 7B. Specifically, as illustrated in FIG. 7B, the conductive paste 101 moves over one surface of the ceramic green sheet 102 so as to spread outward from the banks 1b.

As illustrated in FIG. 7C, as time passes, the conductive paste 101 spreads over the surface of the ceramic green sheet 102 and has a uniform or substantially uniform thickness. When the composite sheet thus obtained is sintered, an electrode having a uniform or substantially uniform film thickness can be formed.

However, in the case where conductor films having a uniform or substantially uniform thickness are used, the adhesion between the conductor films and the ceramic green sheets stacked on the conductor films may not be sufficiently high. This structure can thus cause stacking displacement, as described above.

Figure 8:
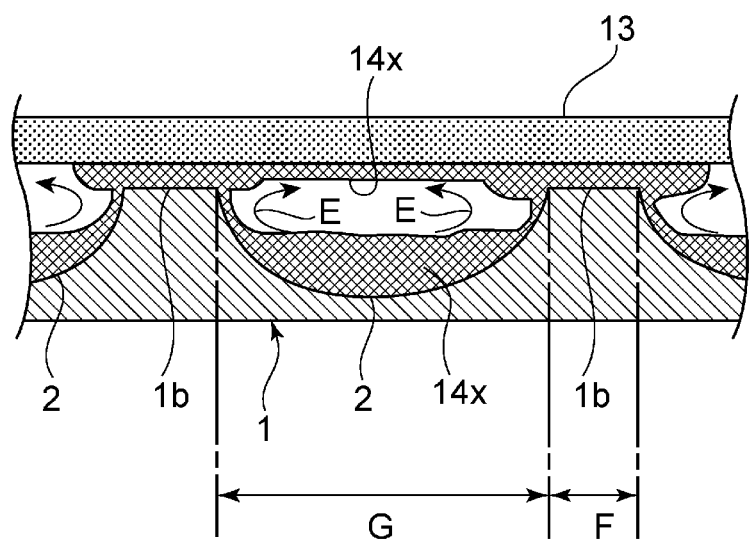
FIG. 8 is a partially cutaway cross-sectional view illustrating a step of transferring a conductive paste from the photogravure to the ceramic green sheet according to another preferred embodiment of the present invention.

In this preferred embodiment on the other hand, as illustrated in FIG. 8, a portion of a conductive paste 14x distributed to a cell 2 is transferred to one surface of the ceramic green sheet 13 along the banks 1b as indicated by arrows E. Then, the conductive paste 14x starts spreading in directions away from the banks 1b as in the case illustrated in FIG. 7B. Unlike the existing case, in the present preferred embodiment, the ceramic green sheet 13 is separated from the photogravure 1 at the state illustrated in FIG. 8. In other words, the conductive paste 14x can have thickness distribution by increasing the printing speed by approximately 10 mm/min to about 30 mm/min, for example, to accelerate separation of the ceramic green sheet 13 from the photogravure 1.

Instead of accelerating separation of the ceramic green sheet 13 from the photogravure 1, the fluidity of the conductive paste 14x may be adjusted to cause the conductive paste 14x to have the desired thickness distribution. Specifically, a conductive paste having a low fluidity and such a composition that the film thickness is less likely to be immediately uniformed as illustrated in FIG. 7C may be used as the conductive paste 14x. Alternatively, accelerating separation of the ceramic green sheet 13 from the photogravure 1 and adjusting the fluidity of the conductive paste may both be used.

Moreover, the particle diameter of conductive particles contained in the conductive paste 14x is preferably small. The use of small diameter particles enhances the viscosity of the conductive paste 14x and reduces the fluidity. Preferably, the particle diameter of conductive particles is about 0.4 μm or smaller, for example. Thus, the conductive paste 14x is reliably and easily provided with the thickness distribution.

To form thin regions in the conductor film 14 as in the case of the present preferred embodiment, a gap between adjacent banks 1b, that is, a width G of a cell 2 is desirably increased. In this way, thin portions are easily formed in the conductive paste 14x.

By contrast, dot-shaped thick regions preferably are formed on the conductor film. In this case, in order to form thick regions, the dimension of the bank 1b in the widthwise direction may be increased and the distance between adjacent banks 1b, that is, the width G of a cell may be narrowed.

In the case where a center thin region is formed in each of dot-shaped thick regions as will be described below, the width G of the cell 2 and the width F of the bank 1b may both be increased.

Figure 9:
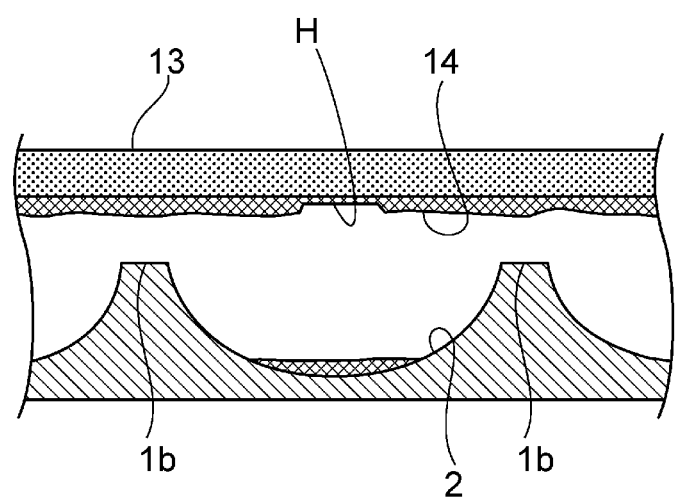
FIG. 9 is a partially cutaway cross-sectional view illustrating a step of transferring a conductive paste from the photogravure to the ceramic green sheet according to another preferred embodiment of the present invention.

By increasing the distance between adjacent banks 1b as illustrated in FIG. 9, a center thin portion H is preferably formed at a center portion of each dot-shaped region on the ceramic green sheet 13. Specifically, a center thin portion H is preferably formed at the center of the thick portion.

The thickness distribution of the conductor film 14 formed on the ceramic green sheet 13 in the above-described manner can be perceived by observing transmitted light. Specifically, the thick portions and the thin portions can be perceived by measuring the intensity of transmitted light. Thus, the thickness distribution and the shape of the conductor film formed on the ceramic green sheet can be optically perceived.

The thickness distribution of internal electrodes in a finally obtained multilayer ceramic electronic component may be perceived in the following manner. A sintered compact is ground until internal electrodes are exposed. After the internal electrodes are exposed, the sintered ceramic compact is immersed in a potassium hydroxide solution and a voltage is applied to the compact. The application of the voltage causes delamination. The delaminated sample is observed by a microscope or the like to perceive the density distribution of conductive particles in a cross section of the internal electrodes. In other words, whether or not the internal electrodes include a high density portion or a low density portion can be perceived visually or through an image processing device.

The thickness distribution of the conductor films can be perceived by measuring the surface state with a contact or contactless roughness measuring device.

Second Preferred Embodiment to Ninth Preferred Embodiment

Composite sheets according to the present invention are not limited to the composite sheets 11 and 12 according to the first preferred embodiment.

Figure 10:
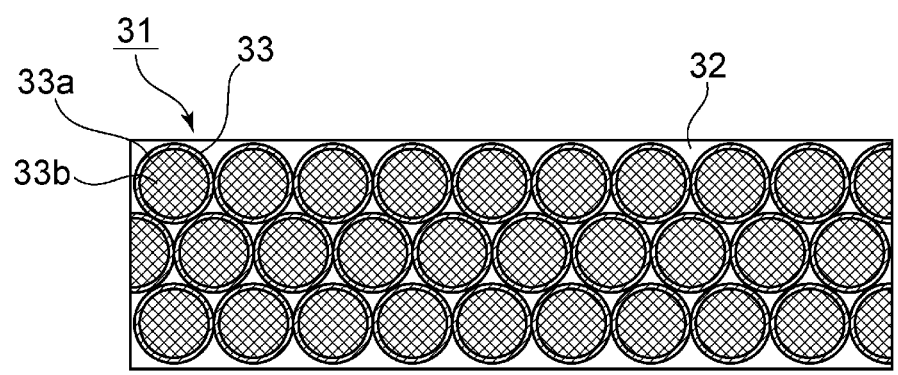
FIG. 10 is a schematic plan view illustrating a conductor film according to a second preferred embodiment of the present invention.

FIG. 10 is a schematic plan view illustrating the thickness distribution of a conductor film on a composite sheet according to a second preferred embodiment of the present invention. In the second preferred embodiment, a conductor film preferably has a rectangular or substantially rectangular shape having a lengthwise direction and a widthwise direction. In third and subsequent preferred embodiments described below, conductor films preferably have a rectangular or substantially rectangular shape having a lengthwise direction that is parallel or substantially parallel to the lengthwise direction of the above-described ceramic green sheet 13.

In the illustration of the second to ninth preferred embodiments, as in the case of the first preferred embodiment, portions of a conductor film having the smallest thickness are not hatched, portions of the conductor film having the second smallest thickness are hatched with oblique lines, and portions of the conductor film having the largest thickness are cross-hatched.

As illustrated in FIG. 10, dot-shaped second regions 33 are arranged in rows extending in the lengthwise direction in a conductor film 31. Also in this preferred embodiment, three rows of dot-shaped regions 33 extending in the lengthwise direction are preferably provided in parallel or substantially in parallel in the lateral direction, for example. Portions other than the dot-shaped second regions 33 are the first regions 32, which are not hatched.

In this preferred embodiment, the first regions 32 have the smallest thickness. On the other hand, the dot-shaped second regions 33 have a larger thickness than the first regions 32 and define and serve as thick regions. In addition, each second region 33 has a circular or substantially circular thick region 33b having the largest thickness at a center portion and a ring-shaped thickness transition region 33a, which is a portion extending from the outer circumference of the thick region 33b to the first region 32. As in the case of this preferred embodiment, the dot-shaped second regions 33 defining and serving as thickness-varied regions may be thick regions that have a larger thickness than the first regions 32. In order to obtain the thickness distribution as in the case of this preferred embodiment, the bank width is preferably set at about 10 μm to about 20 μm and the distance between adjacent banks is preferably set at about 30 μm to about 200 μm, for example.

Figure 11:
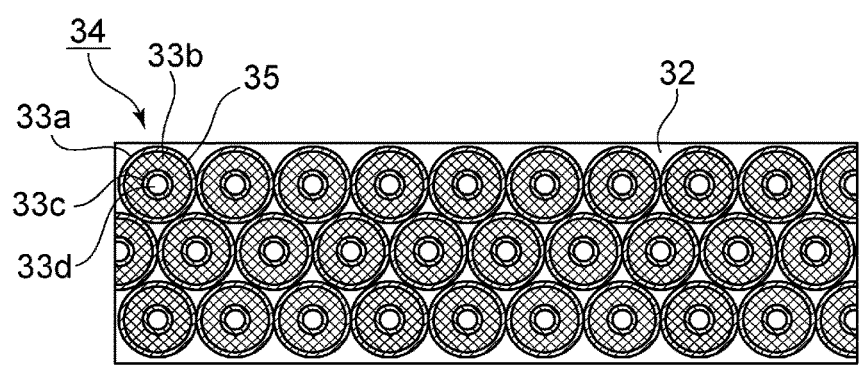
FIG. 11 is a schematic plan view illustrating a conductor film according to a third preferred embodiment of the present invention.

FIG. 11 is a schematic plan view of a conductor film 34 according to a third preferred embodiment of the present invention. In the conductor film 34, as in the case of the second preferred embodiment, rows of dot-shaped second regions 35 extending in the lengthwise direction are provided within the first regions 32 having the smallest thickness. Also in this preferred embodiment, three rows are preferably provided in parallel or substantially in parallel in the lateral direction, for example.

The third preferred embodiment is different from the second preferred embodiment with regard to the point that a circular center thin region 33d is provided at a center portion of each thick region 33b defining and serving as a thickness-varied region. A ring-shaped thickness transition region 33c extends from the outer circumference of the center thin region 33d to the thick region 33b. In this manner, the center thin region 33d is preferably provided within the thick region 33b. In order to obtain the thickness distribution as in the case of this preferred embodiment, the bank width is preferably set at about 3 μm to about 20 μm and the distance between banks that sandwich the cell from both sides is preferably set at about 80 μm to about 200 μm, for example.

The patterns of cells on the photogravures used for printing conductor films 14, 31, and 34 according to the first to third preferred embodiments can be appropriately modified. For example, in a fourth preferred embodiment illustrated in FIG. 12, multiple hexagonal cells 41 are arranged on the surface of a photogravure 1 in a row in the lengthwise direction with banks 42 interposed therebetween in order to form a rectangular or substantially rectangular print. Each bank 42 surrounds a hexagonal cell 41. In addition, ribs 42a extend in the lateral direction toward the long sides of a printing portion 3 from both ends of the bank 42 in the lateral direction, the bank 42 surrounding a cell 41 in the middle row. Each rib 42a is disposed so as to surround a halved-hexagonal shape together with portions of the banks 42 and another rib 42a that is adjacent to the rib 42a in the lengthwise direction in the printing portion 3.

In other words, the cell pattern in the printing portion 3 has a shape such that a structure in which multiple hexagonal cells 41 are alternately arranged is cut in such a manner that outer halves of cells on both sides in the lateral direction are cut off while leaving only the cells 41 in the middle row uncut.

Here, the end of each rib 42a is separated from the long side of the printing portion 3 by a gap 43. This gap 43 may be omitted.

Figure 12:
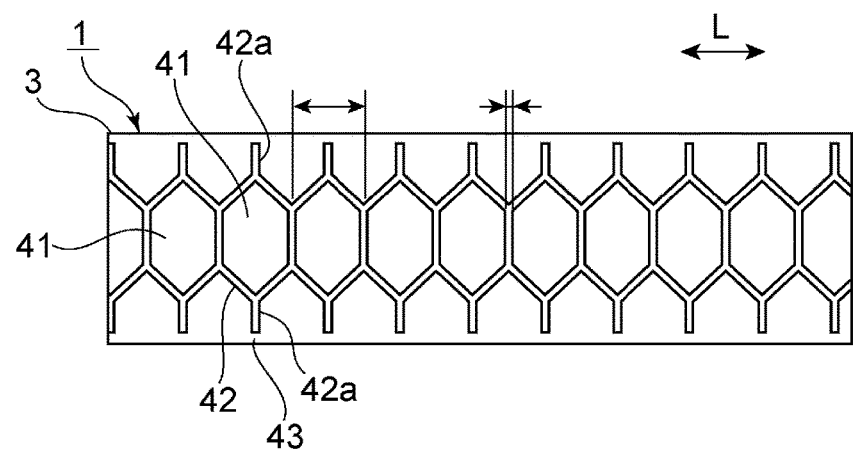
FIG. 12 is a rough plan view illustrating the shape of a printing portion of a photogravure used to form a conductor film according to a fourth preferred embodiment of the present invention.
Figure 13:
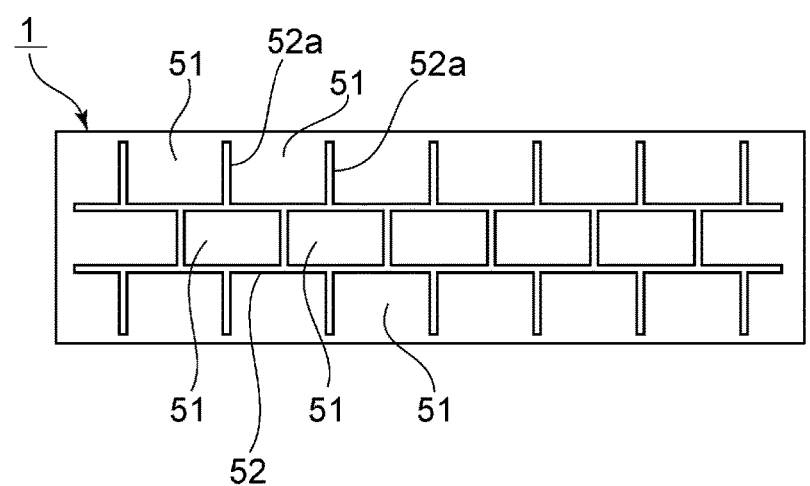
FIG. 13 is a rough plan view illustrating the shape of a printing portion of a photogravure used to form a conductor film according to a fifth preferred embodiment of the present invention.

Although FIG. 12 illustrates a cell pattern that includes hexagonal cells 41, banks 52 may be arranged so as to surround rectangular or substantially rectangular cells 51, as in a fifth preferred embodiment illustrated in FIG. 13. Also in this preferred embodiment, multiple rectangular or substantially rectangular cells 51 are arranged in rows in the lengthwise direction L. Each bank 52 is arranged so as to surround a cell 51. Ribs 52a are formed toward the long sides of the photogravure 1 from middle portions of sides of each bank 52 that are parallel or substantially parallel to the long sides of the photogravure. Thus, rows of multiple rectangular or substantially rectangular cells 51 are similarly arranged on both sides, in the lateral direction, of a middle row of cells 51 so as to extend in the lengthwise direction.

Also in FIG. 13, as in the case illustrated in FIG. 12, the cells 51 arranged in the middle row and multiple cells 51 arranged on both sides in the lateral direction are alternately arranged.

Figure 14:
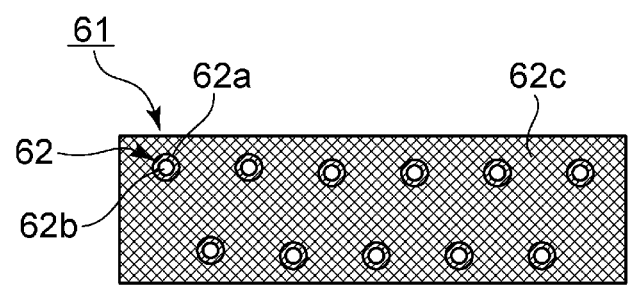
FIG. 14 is a schematic plan view of the structure of a conductor film according to a sixth preferred embodiment of the present invention.

FIG. 14 is a schematic plan view illustrating a conductor film 61 according to a sixth preferred embodiment of the present invention. As in the case of the second preferred embodiment, in the illustration of the conductor film 61, regions that have the smallest thickness are not hatched, regions that have the second smallest thickness are hatched with oblique lines, and a region having the largest thickness is cross-hatched. Here, the conductor film 61 includes multiple dot-shaped second regions 62 arranged in rows in the lengthwise direction. As in the case of the first preferred embodiment, each of the dot-shaped second regions 62 includes a circular or substantially circular thin region 62b at a center portion and a ring-shaped thickness transition region 62a around the thin region 62b. The remaining region defines and serves as a first region 62c. The first region 62c is a region having the largest thickness.

The conductor film 61 according to this preferred embodiment is different from the conductor film according to the first preferred embodiment with regard to the point that the dot-shaped second regions 62 are arranged in two rows in parallel or substantially in parallel in the lateral direction, instead of three rows. In this manner, the number of rows of dot-shaped regions arranged in the lengthwise direction is not limited to three in the present invention and may be two or another appropriate number that is four or larger, for example.

Figure 15:
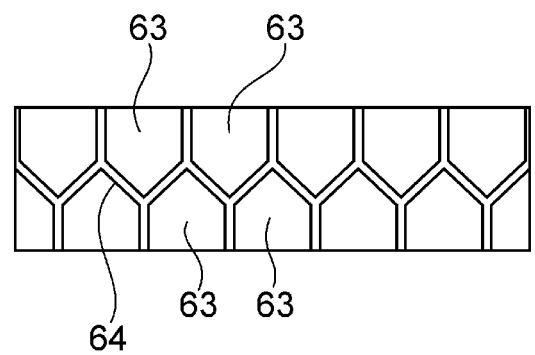
FIG. 15 is a schematic plan view of a printing portion of the photogravure used to print a conductor film according to the sixth preferred embodiment.

FIG. 15 is a schematic plan view illustrating an example of a cell pattern used to obtain the conductor film 61 according to this preferred embodiment. Here, multiple cells 63 having a halved-hexagonal shape are arranged in the lengthwise direction while being separated from one another by banks 64. These cells 63 preferably are arranged in two rows in parallel or substantially in parallel in the lateral direction, for example.

Figure 16:
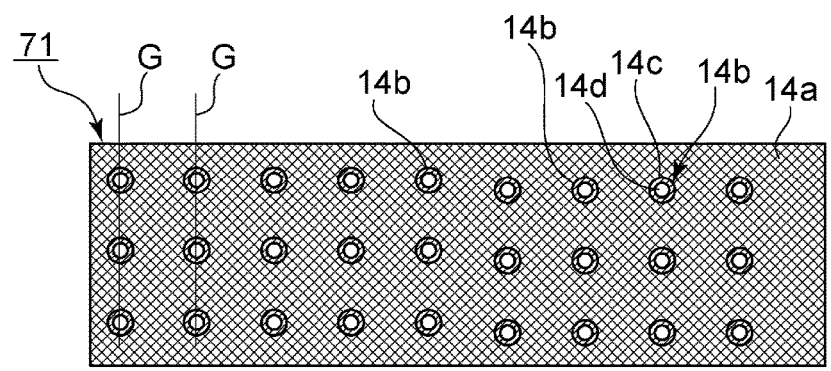
FIG. 16 is a schematic plan view of a conductor film according to a seventh preferred embodiment of the present invention.

FIG. 16 is a schematic plan view of a conductor film 71 according to a seventh preferred embodiment. The conductor film 71 according to the seventh preferred embodiment is the same as the conductor film 14 according to the first preferred embodiment except for the arrangement of dot-shaped second regions. The same portions are thus denoted by the same reference numerals. Multiple dot-shaped second regions 14b are provided within a first region 14a. Each second region 14b includes a circular or substantially circular thin region 14d at a center portion and a ring-shaped thickness transition region 14c that extends from the outer circumference of the thin region 14d to the first region 14a while changing its thickness. The seventh preferred embodiment is different from the first preferred embodiment in that the multiple second regions 14b are arranged in a matrix, instead of alternately. Specifically, as indicated by thin lines G in FIG. 16, second regions 14b that belong to different rows are arranged side by side in the lateral direction.

In this manner, the second regions 14b may be arranged in a matrix instead of alternately.

Figure 17:
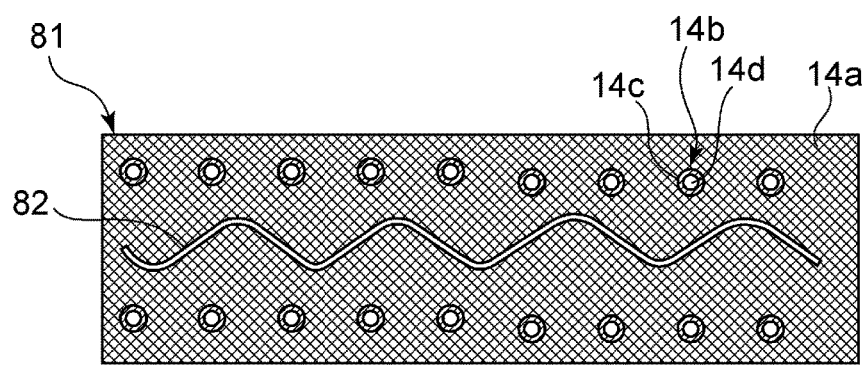
FIG. 17 is a schematic plan view of a conductor film according to an eighth preferred embodiment of the present invention.

FIG. 17 is a schematic plan view of a conductor film according to an eighth preferred embodiment. As in the case of the conductor film 71 according to the seventh preferred embodiment, the conductor film 81 according to the eighth preferred embodiment includes multiple dot-shaped second regions 14b arranged in rows adjacent to the long sides of the conductor film 81. In place of the middle row illustrated in FIG. 16, a zigzag thin region 82 having a small thickness is arranged so as to extend in the lengthwise direction. In this manner, the thin region 82 preferably has a zigzag shape so as to extend in the lengthwise direction. Thus, the adhesion between the conductor film 81 and the ceramic green sheet is enhanced further.

Figure 18:
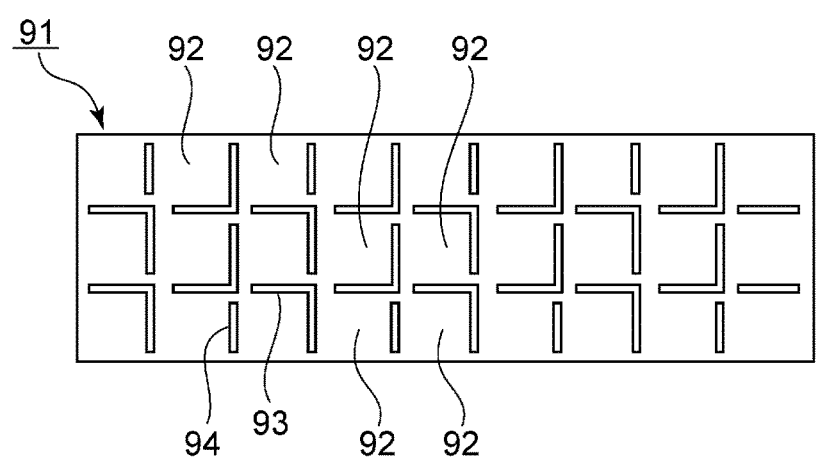
FIG. 18 is a plan view of a photogravure used to form a conductor film according to a ninth preferred embodiment of the present invention.

FIG. 18 is a schematic plan view illustrating a cell pattern 91 on a photogravure used in a ninth preferred embodiment. The cell pattern 91 includes multiple rectangular or substantially rectangular cells 92 arranged in a matrix. Specifically, multiple cells 92 are separated from one another with banks 93 and 94 interposed therebetween. The multiple cells 92 are preferably arranged in three rows so as to extend in the lengthwise direction, for example. The multiple cells 92 are arranged in a matrix. Here, L-shaped banks 93 and I-shaped banks 94 preferably are appropriately combined to define the cells 92. For example, by using the cell pattern on the photogravure used in the ninth preferred embodiment, the conductor film according to the eighth preferred embodiment can be obtained. In order to obtain the conductor film according to the eighth preferred embodiment, the length of a cut-out portion of the bank 93 in which a portion of the bank 93 is cut out such that adjacent cells 92 separate from each other while allowing the cells 92 to be continuous with each other is preferably about 50% to about 80% of the distance between banks on both sides of a cell, for example.

As is clear from the second to ninth preferred embodiments, the cell pattern on the photogravure and the arrangement pattern of the thin regions and the thick regions on the conductor film can be modified in various manners in the present invention and these patterns are not limited to those according to the preferred embodiments illustrated.

The above-described preferred embodiments have described a multilayer ceramic capacitor and a method for manufacturing the multilayer ceramic capacitor merely as non-limiting examples. The present invention, however, is applicable to various types of multilayer ceramic electronic components including multilayer ceramic piezoelectric components, multilayer ceramic inductors, or multilayer ceramic substrates, and a method for manufacturing the same, other than the multilayer ceramic capacitor and the method for manufacturing the multilayer ceramic capacitor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a multilayer ceramic electronic component, comprising:
    a step of preparing a plurality of composite sheets each including a ceramic green sheet having a lengthwise dimension extending in a lengthwise direction, and a conductor film printed on the ceramic green sheet after the ceramic green sheet is formed, wherein the conductor film includes a plurality of thickness-varied regions arranged in a row extending along the lengthwise direction while being dispersed in the lengthwise direction, the thickness-varied regions have a thickness that is different from a thickness of a portion of the conductor film excluding the thickness-varied regions;
    a step of stacking the plurality of composite sheets on top of one another to obtain a multilayer body;
    a step of cutting the multilayer body into multilayer pieces forming individual multilayer ceramic electronic components; and
    a step of sintering the multilayer pieces forming the individual multilayer ceramic electronic components to obtain sintered ceramic compacts each including a plurality of internal electrodes formed by sintering the conductor films; wherein
    the thickness-varied regions have a dot shape or substantially a dot shape when seen in a plan view.

2. The method according to claim 1, wherein the multilayer ceramic electronic component is a multilayer ceramic capacitor.

3. The method according to claim 1, wherein the plurality of thickness-varied regions define a plurality of rows.

4. The method according to claim 1, wherein the thickness-varied regions are thin regions that have a smaller thickness than the portion of the conductor film excluding the thickness-varied regions.

5. The method according to claim 1, wherein the thickness-varied regions are thick regions that have a larger thickness than the portion of the conductor film excluding the thickness-varied regions.

6. The method according to claim 5, wherein a center thin region that has a smaller thickness than the thick regions is provided within the thick regions.

* * * * *